(12) United States Patent
Ouwenga et al.

(10) Patent No.: US 8,464,697 B2
(45) Date of Patent: Jun. 18, 2013

(54) INTEGRATED CLUTCH SUPERCHARGER

(75) Inventors: Daniel Robert Ouwenga, Battle Creek, MI (US); Christopher W. Creager, Ypsilanti, MI (US)

(73) Assignee: Eaton Corporation, Cleveland, OH (US)

( * ) Notice: Subject to any disclaimer, the term of this patent is extended or adjusted under 35 U.S.C. 154(b) by 320 days.

(21) Appl. No.: 12/856,121

(22) Filed: Aug. 13, 2010

(65) Prior Publication Data
US 2012/0037473 A1 Feb. 16, 2012

(51) Int. Cl.
| F02B 33/00 | (2006.01) |
| F04B 35/00 | (2006.01) |
| F16D 67/06 | (2006.01) |
| F16D 67/02 | (2006.01) |
| F16D 19/00 | (2006.01) |
| F16D 27/00 | (2006.01) |
| F16D 37/02 | (2006.01) |
| F16D 11/06 | (2006.01) |
| F16D 13/22 | (2006.01) |
| F16H 3/74 | (2006.01) |

(52) U.S. Cl.
USPC ............. 123/559.3; 123/561; 192/84.96; 192/84.961; 192/18 R; 192/12 D; 417/319; 475/258

(58) Field of Classification Search
USPC .......... 123/559.3, 561; 418/69 AN, 181 D, 418/181; 417/319; 475/258; 192/18 R, 12 D, 192/84.96, 84.961
See application file for complete search history.

(56) References Cited

U.S. PATENT DOCUMENTS

| 505,025 | A | * | 9/1893 | Brown | 192/84.9 |
| 879,274 | A | * | 2/1908 | Kramer | 192/84.9 |
| 2,944,647 | A | * | 7/1960 | Twyman | 192/18 R |
| 3,036,680 | A | * | 5/1962 | Jaeschke | 192/84.96 |
| 3,312,319 | A | * | 4/1967 | Carroll et al. | 192/84.9 |
| 3,736,079 | A | * | 5/1973 | Kantz | 418/77 |
| 3,945,476 | A | * | 3/1976 | de Jong | 192/12 D |
| 4,519,373 | A | | 5/1985 | Hardy et al. | |
| 4,570,768 | A | * | 2/1986 | Nishimura et al. | 192/84.81 |
| 5,052,534 | A | * | 10/1991 | Gustin et al. | 192/84.96 |

(Continued)

FOREIGN PATENT DOCUMENTS

| DE | 3740365 A1 | 8/1989 |
| DE | 102005035298 A1 | 2/2007 |

(Continued)

OTHER PUBLICATIONS

English Abstract of Japanese Patent Publication No. JP1280636, published Nov. 10, 1989.

(Continued)

*Primary Examiner* — Thai Ba Trieu
(74) *Attorney, Agent, or Firm* — Dykema Gossett PLLC

(57) ABSTRACT

A clutch assembly configured for use with a supercharger having a first shaft having a longitudinal axis; a pulley connected to the first shaft; a clutch rotor mounted connected to the first shaft; a clutch armature mounted to a second shaft and unconnected to the first shaft; and a clutch coil spaced along the longitudinal axis from the pulley. The clutch rotor rotates around the longitudinal axis. The clutch armature also rotates around the longitudinal axis. The design diameter of the pulley is entirely independent of the diameters of the clutch rotor, the clutch armature, and the clutch coil. A supercharger including the clutch assembly is also provided.

18 Claims, 3 Drawing Sheets

U.S. PATENT DOCUMENTS

| | | | |
|---|---|---|---|
| 5,133,325 A | 7/1992 | Winkelmann | |
| 5,273,409 A | 12/1993 | Swain | |
| 5,609,232 A | 3/1997 | Brownfield et al. | |
| 5,752,810 A | 5/1998 | Hein | |
| 6,289,882 B1 | 9/2001 | Slicker | |
| 6,331,103 B1 * | 12/2001 | Teraoka | 418/181 |
| 6,375,442 B1 | 4/2002 | Ward et al. | |
| 6,634,344 B2 | 10/2003 | Stretch | |
| 6,837,195 B2 * | 1/2005 | Suwazono | 123/559.1 |
| 2007/0265132 A1 | 11/2007 | Antonov | |
| 2008/0053417 A1 | 3/2008 | Eybergen et al. | |

FOREIGN PATENT DOCUMENTS

| | | | |
|---|---|---|---|
| EP | 545189 A1 * | 6/1993 | |
| EP | 557598 A1 * | 9/1993 | |
| EP | 0557598 A1 | 9/1993 | |
| FR | 2476208 A2 | 8/1981 | |
| JP | 1280636 A | 11/1989 | |
| JP | 2185625 A | 7/1990 | |
| WO | WO 99/49229 | 9/1999 | |

OTHER PUBLICATIONS

English Abstract of German Patent Publication No. De 3740365, published Jun. 8, 1989.

English Abstract of Japanese Publication No. JP2185625, published on Jul. 20, 1990.

English Abstract of European Publication No. EP0557598, published on Sep. 1, 1993.

European Patent Office, International Search Report and Written Opinion issued in counterpart international application No. PCT/IB2011/001852, filed Aug. 12, 2011. Date of Mailing: Dec. 29, 2011.

* cited by examiner

INTEGRATED CLUTCH SUPERCHARGER

TECHNICAL FIELD

The present invention generally relates to a clutch assembly for use with a supercharger (e.g., any type of positive displacement fluid pump, including Roots-type rotary blowers, screw-type air pumps, and any other similar devices).

BACKGROUND

The use of a supercharger to increase or "boost" the air pressure in the intake manifold of an internal combustion engine to result in an engine having a greater horsepower output capability is generally known. The engine may thus have an increased horsepower output capability than would otherwise occur if the engine were normally aspirated (e.g., the piston would draw air into the cylinder during the intake stroke of the piston). A conventional supercharger is generally mechanically driven by the engine, and therefore, may represent a drain on engine horsepower whenever engine "boost" may not be required and/or desired. Some sort of engageable/disengageable clutch may be disposed in series between the supercharger input (e.g., a belt driven pulley) and the rotors of the supercharger.

There are three basic types of clutch assembly configurations and/or designs: (1) a large pulley configuration; (2) a small pulley configuration; and (3) a remote mount clutch configuration. While each of these three basic types of clutch assemblies can operate in a commercially acceptable and satisfactory manner, there may be potential disadvantages associated with each type of the above-referenced clutch assemblies. With respect to a large pulley configuration, for example, the pulley is generally integrated to the rotor, and the pulley is of a large enough diameter so as to fit over a clutch coil that is mounted to the supercharger cover. Because the pulley is integrated to the rotor, the pulley design is dependent on the torque capacity of the clutch. In other words, the pulley diameter must be increased if the torque capacity of the clutch is increased. This results in undesirable packaging requirements because the required pulley diameters are typically too large to be commercially feasible. In addition, a large pulley has high inertia. With respect to a small pulley configuration, the pulley design may not be dependent on the size of the clutch coil. However, the pulley is generally integrated with the clutch armature. Because the clutch armature is fixed to the pulley, the clutch armature is generally rotating at the speed of the pulley even when the clutch is disengaged, and the armature may not be particularly stable at higher speeds. In addition, in some configurations, the bearings may have an increased bearing load, and the absence of relative motion between the inner and outer race of the bearing when the clutch is in an engaged position may put additional stress and/or load on the bearings. This may allow damage (e.g., fretting) to the bearings. The fretting becomes an issue due to the belt loads that must be supported by the stationary bearing. Finally, with respect to a remote-mount pulley configuration, the pulley has the highest inertia associated with putting the clutch in an engaged position.

SUMMARY

It may be desirable to provide an improved clutch assembly configured for use with a supercharger that may overcome the above-described disadvantages. For example, the improved clutch assembly may be configured to allow the design of the pulley to be independent of the torque capacity of the clutch by separating the pulley from the clutch rotor and the clutch coil, for example. The pulley may also be separated from the clutch armature so that rotation of the clutch armature is not tied to rotation of the pulley even when the clutch assembly is disengaged from the supercharger. The design of the improved clutch assembly may also allow the relatively large size (e.g., diameter) of the clutch assembly to be closer to the main housing of the supercharger, thereby decreasing the packaging envelope in the area around the pulley. Finally, in some embodiments, the improved clutch assembly may be configured to allow the supercharger to achieve required speeds without damage to the clutch components; may enable a small pulley diameter while maintaining improved bearing life.

A clutch assembly configured for use with a supercharger includes a first shaft having a longitudinal axis; a pulley connected to the first shaft; a clutch rotor connected to the first shaft; a clutch armature unconnected to the first shaft; and a clutch coil spaced along the longitudinal axis from the pulley. The clutch rotor rotates around the longitudinal axis. The clutch armature also rotates around the longitudinal axis. The diameter of the pulley is independent of the diameters of the clutch rotor, the clutch armature, and the clutch coil.

A supercharger including the clutch assembly is also provided. The supercharger includes a clutch assembly comprising a clutch housing; a first shaft having a longitudinal axis; a pulley connected to the first shaft; a clutch rotor connected to the first shaft; a clutch armature unconnected to the first shaft; and a clutch coil spaced along the longitudinal axis from the pulley. The clutch rotor rotates around the longitudinal axis. The clutch armature also rotates around the longitudinal axis. The diameter of the pulley is independent of the diameters of the clutch rotor, the clutch armature, and the clutch coil. The supercharger further includes a supercharger housing, a plurality of supercharger rotors disposed within the supercharger housing, a second shaft configured to drive rotation of the plurality of supercharger rotors; and a step-up gear connected to the second shaft.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims. For example, the present invention may be used advantageously with superchargers having various designs and configurations, such as Roots type blower superchargers, screw compressors, and any number of other various positive displacement pumps.

Figure 1:
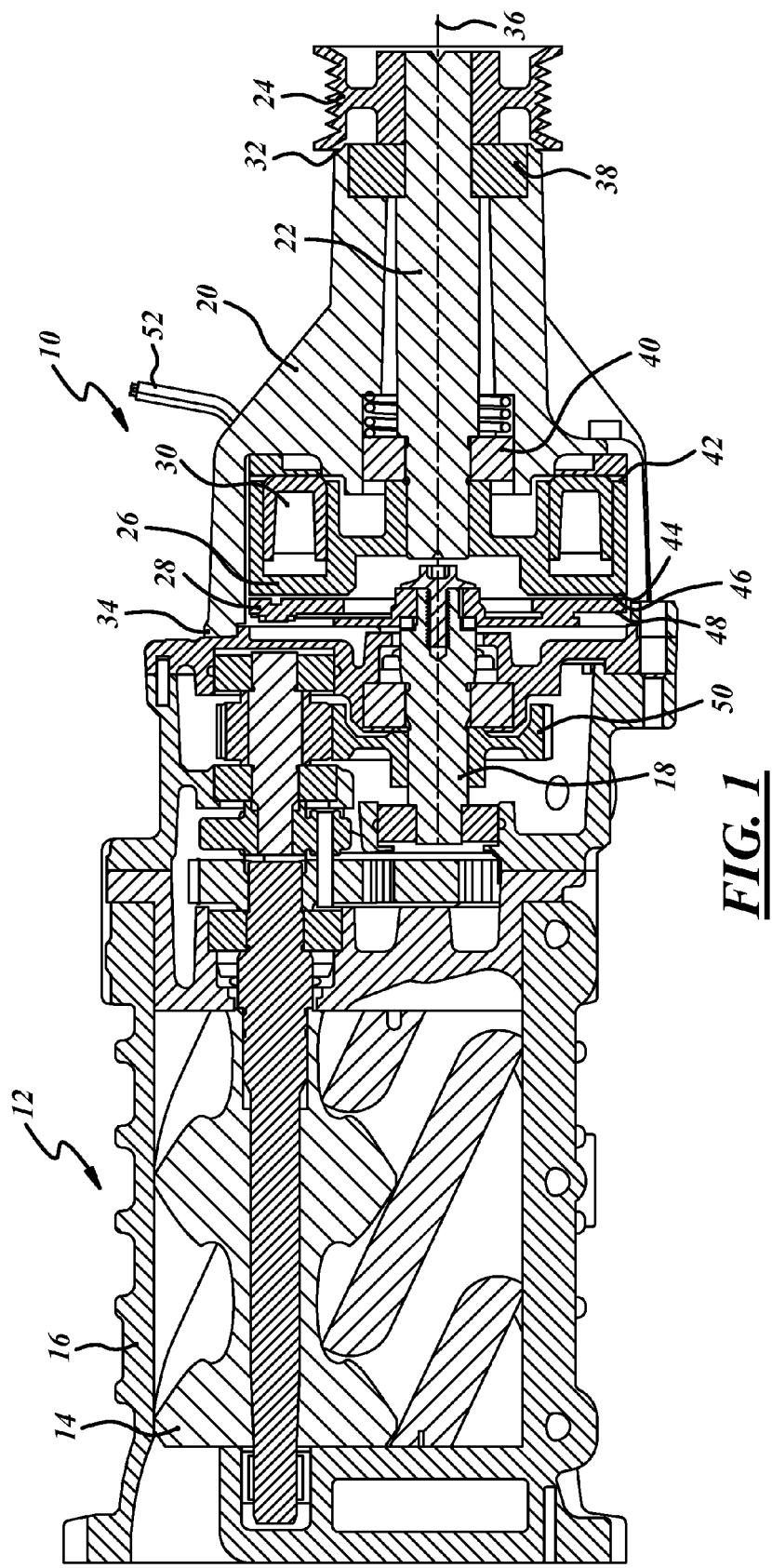
FIG. 1 is a cross-sectional view of a clutch assembly in accordance with an embodiment of the invention.

A clutch assembly 10 in accordance with an embodiment of the invention is shown in FIG. 1. The clutch assembly 10 is configured for use with a supercharger 12 in accordance with an embodiment of the invention. The supercharger 12 may be part of an intake manifold assembly for an engine (not shown). The engine may include a plurality of cylinders and a reciprocating piston disposed within each cylinder, thereby defining an expandable combustion chamber. The engine may include intake and exhaust manifold assemblies for directing combustion fluid to and from the combustion chamber by way of intake and exhaust valves, respectively.

The supercharger 12 of the intake manifold assembly may be any positive displacement pump, including the Roots type blower supercharger as illustrated and described in U.S. Pat. Nos. 5,078,583 and 5,893,355 which are owned by the assignee of the present invention and which are hereby incorporated by reference in their entirety, but are not necessarily limited thereto. The supercharger 12 may also comprise a screw compressors or any other type of positive displacement pump. In accordance with an embodiment of the invention, the supercharger 12 may include a plurality (e.g., pair) of rotors 14, each having a plurality of meshed lobes. The rotors may be disposed in a plurality of parallel, transversely overlapping cylindrical chambers and may be driven by engine crankshaft torque transmitted thereto in a known manner (e.g., a drive belt). The supercharger 12 may include a main housing 16 that may define the plurality of cylindrical chambers. The mechanical drive of the supercharger 12, including shaft 18, may rotate the rotors 14 at a fixed ratio, relative to the crankshaft speed, such that the displacement of the supercharger 12 is greater than the engine displacement, thereby boosting or supercharging the air flowing into the combustion chamber of the engine. The supercharger 12 may include an inlet port configured to receive fluid from an inlet duct or passage and an outlet port configured to direct the charged air to the intake valves via a discharge duct. The inlet duct or passage and the discharge duct may be interconnected by means of a bypass passage. A bypass valve may be disposed within the bypass passage and may be configured to be moved between an open position and a closed position by means of an actuator assembly.

The supercharger 12 may be coupled to clutch assembly 10 in any manner conventional in the art. further include an input housing that serves as the clutch housing 12 for the clutch assembly 10. Clutch assembly 10 includes clutch housing 20, a shaft 22, a pulley 24, a clutch rotor 26, a clutch armature 28, and a clutch coil 30. The clutch housing 20 may be configured to house other components of the clutch assembly 10. Clutch housing 12 may be smaller in diameter at a first end 32 and larger in diameter at a second end 34. The first end 32 may be proximate pulley 24. The second end 34 may be proximate the main housing 16 of the supercharger 12.

Figure 2:
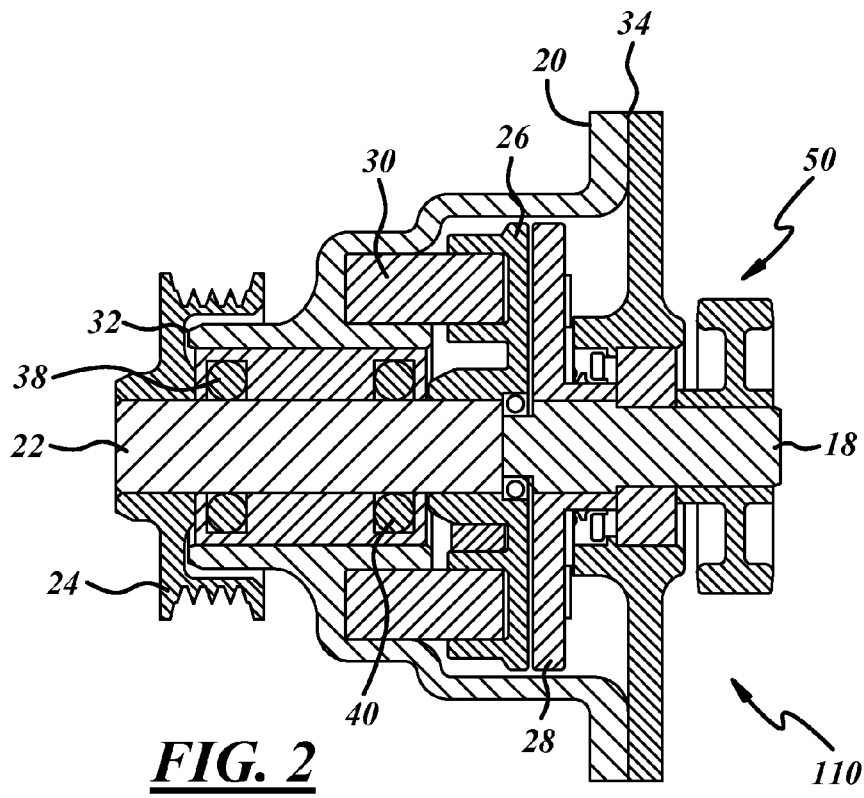
FIG. 2 is a cross-sectional view of a clutch assembly in accordance with an embodiment of the invention.
Figure 3:
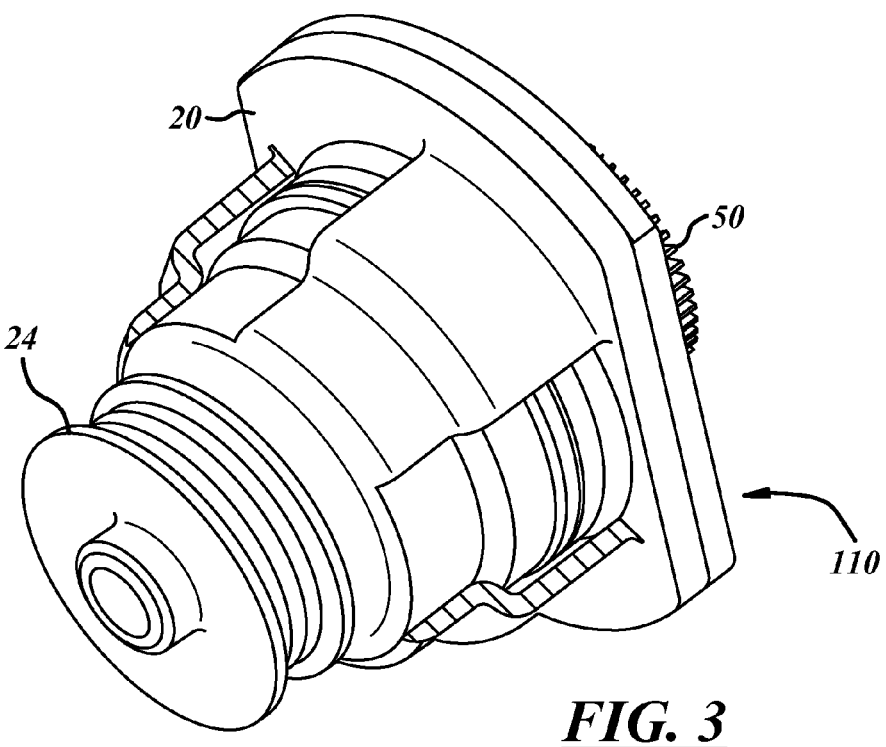
FIG. 3 is a perspective view of a clutch assembly in accordance with an embodiment of the invention.
Figure 4:
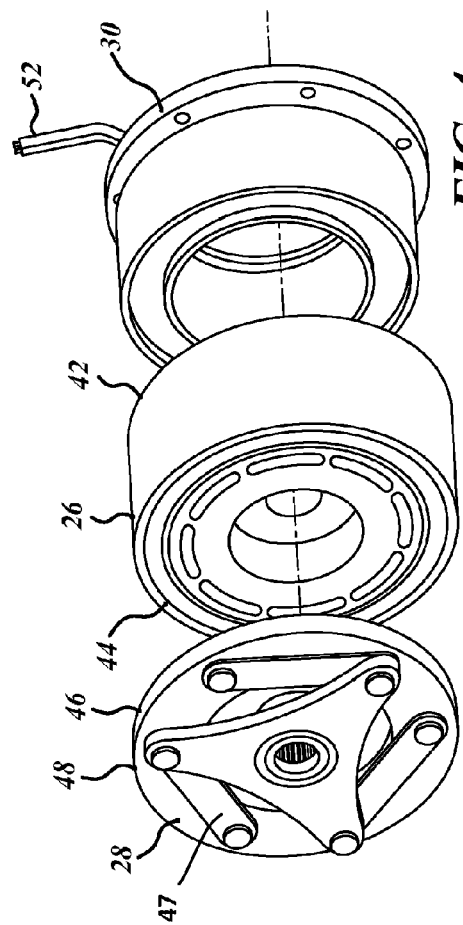
FIG. 4 is an exploded perspective view of a clutch armature, clutch rotor, and clutch coil of a clutch assembly in accordance with an embodiment of the invention.
Figure 5:
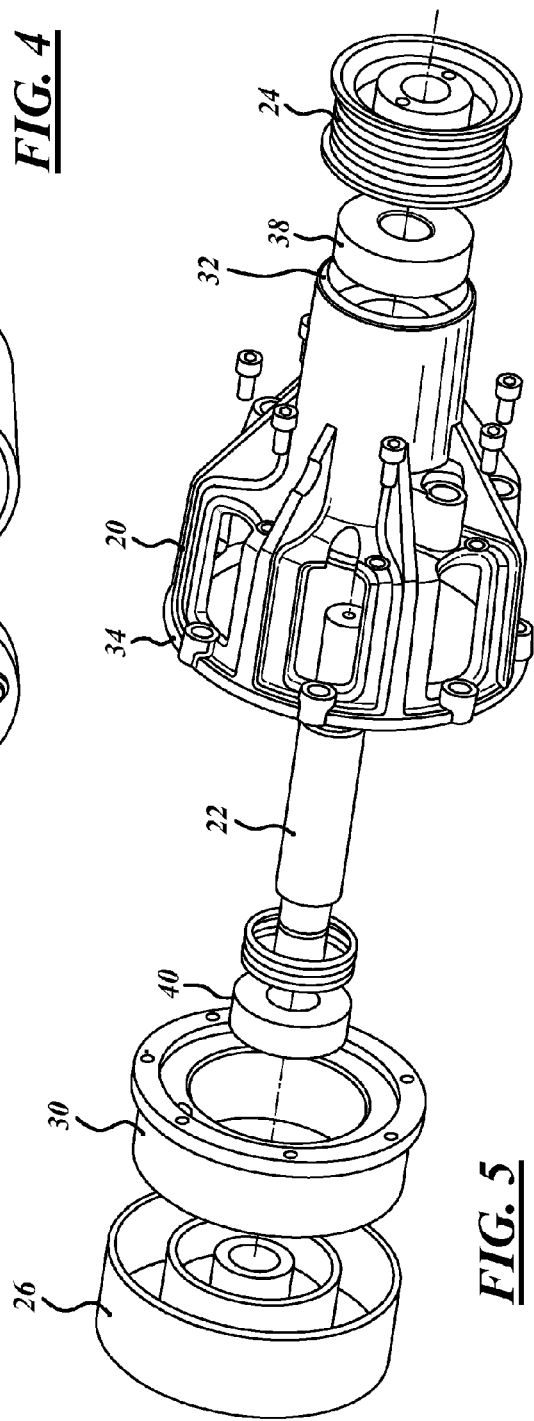
FIG. 5 is an exploded perspective view of a portion of a clutch assembly in accordance with an embodiment of the invention.

Shaft 22 may have a longitudinal axis 36 about which shaft 22 may rotate. Shaft 22 may be supported within clutch housing 20 by at least one bearing 38. For example and without limitation, shaft 22 may be supported within clutch housing 12 by a plurality (e.g., pair) of bearings 38, 40. The bearings 38, 40 may be disposed between the clutch housing 20 and shaft 22. Referring now to FIGS. 2-3, an alternative embodiment of the clutch assembly 110 is generally illustrated. As generally illustrated in FIGS. 2-3, at least a portion of the pulley 24 may circumferentially surround at least one bearing 38. By locating pulley 24 directly over at least one bearing 38, the other bearing 40 may not need to be configured to support a radial load exerted by the pulley 22. Each of the bearings 38, 40 may comprise an inner race and an outer race in accordance with an embodiment of the invention. There may be substantially no relative motion between the inner race and the outer race of the bearings 38, 40 when the clutch assembly 10, 110 is engaged.

Referring now to FIGS. 1-3 and 5, 6, the pulley 24 may be configured to transmit torque from the engine crankshaft (not shown) to shaft 22 during engagement of the clutch assembly 10. The pulley 24 may be connected to shaft 22. The pulley 24 may be disposed externally to shaft 22 in accordance with an embodiment of the invention. The pulley 24 may be disposed at an end of shaft 22 and may circumferentially surround shaft 22. The pulley 24 may be external to the clutch housing 20 in accordance with an embodiment of the invention. The pulley 24 may be axially spaced along the longitudinal axis 36 from the clutch housing 20. In accordance with an embodiment of the invention, at least one bearing 38 that is disposed between the clutch housing 20 and shaft 22 may be proximate the pulley 22. Another bearing 40 may be disposed between the clutch housing 20 and shaft 22 closer toward the main housing 16 of the supercharger 12. The pulley 24 may be separated from (i.e., not integral with) other components of the clutch assembly 10. For example, the pulley 24 may be separated from (i.e., not integral with) the clutch armature 28.

The pulley 24 may have a diameter that is independent of the diameters of the clutch rotor 26, the clutch armature 28, and the clutch coil 30. The pulley 24, including its design and configuration, is independent of the torque capacity of the clutch rotor 26, the clutch armature 28, and the clutch coil 30. In accordance with a certain torque capacity of the supercharger 12, the pulley 24 may have a diameter that is less than about 85 mm in accordance with an embodiment of the invention. The pulley 24 may have a diameter that is between about 45 mm and about 85 mm in accordance with an embodiment of the invention. Based on the diameter of the pulley 24, the pulley 24 may conventionally be considered a small pulley. The pulley 24 may have a diameter that is smaller than the diameter of the clutch coil 30 in accordance with an embodiment of the invention, as the pulley 24 may not surround the clutch coil 30 in accordance with an embodiment of the invention. The pulley 24 may also not be integrated with clutch rotor 26 in accordance with an embodiment of the invention.

The clutch rotor 26 may be configured to be magnetized and set up a magnetic loop that attracts the clutch armature 28. The clutch rotor 26 may be connected to shaft 22 and/or pulley 24 in accordance with an embodiment of the invention. The clutch rotor 26 may rotate around the longitudinal axis 36 of shaft 22. The clutch rotor 26 is not connected to shaft 18 of the supercharger as may be conventional in small pulley designs. The clutch rotor 26 may comprise steel in accordance with an embodiment of the invention. Although steel is mentioned in detail for one embodiment of the invention, the clutch rotor 26 may comprise any number of other materials in accordance with other embodiments of the invention. The clutch rotor 26 may rotate at rotational speeds that are at least the same as the pulley 24 and may rotate at rotational speeds greater than those capable by the clutch armature 28 in an embodiment of the invention. Because the clutch rotor 26 may be connected to shaft 22 and/or pulley 24, the clutch rotor 26 may always maintain the same rotational speed as the pulley 24 in accordance with an embodiment of the invention. In other words, the clutch rotor 26 may rotate at a rotational speed that is substantially the same as the rotational speed of shaft 22 even when the clutch assembly 10 is disengaged. The clutch rotor 26 may generally be more stable at higher speeds than the clutch armature 28. The clutch rotor 26 may be disposed between the clutch armature 28 and the clutch coil 30 along the longitudinal axis 36 of shaft 22. The clutch rotor 26 may have a first face 42 that is configured to at least partially surround the clutch coil 30. The clutch rotor 26 may have a second face 44 (i.e., opposing the first face 42) that is configured to face the clutch armature 28.

The clutch armature 28 may rotate around the longitudinal axis 36 of shaft 22. The clutch armature 28 may be configured to be pulled against the clutch rotor 26 and apply a frictional force at contact. The load of the clutch armature 28 may thus be accelerated to match the rotational speed of the clutch rotor 26. The clutch armature 28 may be disposed between the clutch rotor 18 and the supercharger 12 along the longitudinal axis 36 of shaft 22. The clutch armature 28 may have a first face 46 that is configured to face the second face 44 of the clutch rotor 26 and may include a friction material. The clutch armature 28 may have a second face 48 (i.e., opposing the first face 46) that is configured to face the supercharger 12. The clutch armature 28 may be connected to shaft 18 of supercharger 12 through a spline and bolt. The clutch armature 28 may contain speed sensitive components (e.g., springs 47) in accordance with an embodiment of the invention. The rotational speed of the clutch armature 28 may be less than the rotational speed of shaft 22 when the clutch assembly 10, 110 is disengaged. Accordingly, the clutch armature 28 may be configured to coast down to a stop in accordance with an embodiment of the invention when the clutch assembly 10, 110 is disengaged, rather than always having to maintain the same rotational speed as the pulley 24. Clutch armature 28 may not be connected to shaft 22 and/or pulley 24 in an embodiment of the invention. Instead, clutch armature 28 may be separated from the pulley 24 in accordance with an embodiment of the invention. Clutch armature 20 may be connected to shaft 18 of the supercharger 12. The rotational speed of the clutch armature 28 may be substantially the same as the rotational speed of shaft 22 when the clutch assembly 10, 110 is engaged. Because it may be more difficult to keep the clutch armature 28 stable at higher speeds because of the inclusion of speed sensitive material, like the springs 47, the clutch armature 28 may not be connected to shaft 22 and/or pulley 24. The clutch armature 28 may be separated from the pulley 24, and therefore, the clutch armature 28 may not influence the size and/or range of the pulley 24. By separating the clutch armature 28 from the pulley 24, the size of the clutch housing 20 in the area around the pulley 24 may be decreased. Furthermore, the size and configuration of the pulley 24 may not depend on the size and/or torque capacity of the armature 28.

The clutch coil 30 may comprise a source of magnetic flux. An electrical current and/or voltage may be applied to the clutch coil 30 to generate a magnetic field in the vicinity of the clutch coil 30 and produce magnetic lines of flux. The intensity of the magnetic field may be proportional to the level of current provided. This flux may then be transferred through the small working air gap between the clutch coil 30 and the clutch rotor 26. The clutch rotor 26 may thus become magnetized and set up a magnetic loop that attracts the clutch armature 28. The clutch armature 28 may then be pulled against the clutch rotor 26 and a frictional force may be applied at contact and the load on the clutch armature 28 may be accelerated to match the speed of the clutch rotor 26. When current and/or voltage is removed from the clutch assembly 10, 110, the clutch armature 28 may be free to turn with the shaft 18 of supercharger 12. The clutch coil 30 may not be surrounded by pulley 24. Instead, the clutch coil 30 may be mounted in the clutch rotor 26 and may be located closer to the housing 16 of the supercharger 12. The clutch coil 30 may be disposed between the clutch rotor 26 and the clutch housing 20 in a direction along the longitudinal axis 36 of shaft 22. The clutch coil 30 may be spaced along the longitudinal axis 36 of shaft 22 from the pulley 24. The clutch coil 30 may be separated from the pulley 24, and therefore, the clutch coil 30 may not influence the size and/or range of the pulley 24. By separating the clutch coil 30 from the pulley 24, the size of the clutch housing 20 in the area around the pulley 24 may be decreased. Furthermore, the size and configuration of the pulley 24 may not depend on the size and/or torque capacity of the clutch coil 30.

The clutch coil 30 may be controlled by an electronic control unit (ECU) (not shown) that provides an electrical signal to the clutch coil 30 (e.g., via wires 52). The ECU may process input, such as for example, but not limited to, sensor readings corresponding to vehicle parameters and process the input according to log rules to determine the appropriate electrical signal to provide to clutch coil 30. The ECU may comprise a microprocessor having sufficient memory to store the logic rules (e.g., in the form of a computer program) for controlling operation of the clutch assembly 10, 110.

A supercharger 12 including a clutch assembly 10, 110 in accordance with an embodiment of the invention may further include a step-up gear 50 connected to shaft 18 of the supercharger 12. Accordingly, at least one of the rotors 14 of the supercharger 12 may utilize an input drive configuration including for example and without limitation, shaft 18 and step up gear 50, by means of which the supercharger 12 may receive input drive torque. A supercharger 12 in accordance with an embodiment of the invention may comprise the clutch assembly 10, 110; housing 16; a plurality of rotors 14 disposed within housing 16; shaft 18 configured to drive rotation of the plurality of rotors 14; and step-up gear 50 connected to shaft 18.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents

What is claimed:

1. A clutch assembly configured for use with a supercharger, the clutch assembly comprising:
    a first shaft having a longitudinal axis;
    a pulley connected to the first shaft;
    a clutch rotor mounted to the first shaft, wherein the clutch rotor rotates around the longitudinal axis;
    a clutch armature mounted to a second shaft and unconnected to the first shaft, wherein the clutch armature rotates around the longitudinal axis; and a clutch coil spaced along the longitudinal axis from the pulley, wherein a diameter of the pulley is entirely independent of diameters or the clutch rotor, the clutch armature, and the clutch coil.

2. The clutch assembly of claim 1, wherein the second shaft is a mechanical drive shaft of the supercharger.

3. The clutch assembly of claim 1, wherein the clutch armature further comprises springs.

4. The clutch assembly of claim 1, wherein the clutch rotor is magnetized by the clutch coil.

5. The clutch assembly of claim 1, further comprising, a clutch housing.

6. The clutch assembly of claim 5, wherein the clutch coil is mounted in the clutch rotor and is disposed between the clutch housing and the clutch rotor in a direction along the longitudinal axis of the input shaft.

7. The clutch assembly of claim 5, further comprising at least two bearings disposed between the clutch housing and the input shaft.

8. The clutch assembly of claim 7, wherein at least a portion of the pulley circumferentially surrounds one of the at least two bearings and wherein the other of the at least two bearings is not configured to support a radial load exerted by the pulley.

9. The clutch assembly of claim 5, wherein the clutch housing is smaller in diameter at a first end proximate the pulley and larger in diameter at a second end proximate the supercharger.

10. The clutch assembly of claim 1, wherein the diameter of the pulley is smaller than the diameter of the clutch coil.

11. The clutch assembly of claim 1, wherein the pulley is not integrated into the clutch rotor.

12. The clutch assembly of claim 1, wherein a design of the pulley is independent of a torque capacity of the clutch rotor, clutch armature, and clutch coil.

13. The clutch assembly of claim 1, wherein the clutch armature is remains stationary when the clutch assembly is disengaged and the first shaft rotates.

14. The clutch assembly of claim 1, wherein a rotational speed of the clutch armature is the same as a rotational speed of the first shaft when the clutch assembly is engaged.

15. The clutch assembly of claim 1, wherein a rotational speed of the clutch rotor is the same as a rotational speed of the first shaft when the clutch assembly is disengaged.

16. The clutch assembly of claim 1, wherein the clutch armature is configured to he pulled against the clutch rotor.

17. The clutch assembly of claim 1, wherein the clutch coil is mounted to a supercharger cover and is unconnected from the pulley.

18. A supercharger system, comprising:
a clutch assembly comprising:
   a clutch housing:
   a first shaft having a longitudinal axis:
   a pulley connected to the first shaft;
   a clutch rotor mounted to the first shaft, wherein the clutch rotor rotates around the longitudinal axis;
   a clutch armature mounted to a second shaft and unconnected to the first shaft, wherein the clutch armature rotates around the longitudinal axis of the first shaft;
   a clutch coil spaced along the longitudinal axis of the first shaft from the pulley; and
as supercharger housing;
a plurality of supercharger rotors disposed within the supercharger housing;
a third shaft configured to drive rotation of the plurality of supercharger rotors;
a step-up gear connected to the second shaft;
wherein a diameter of the pulley is independent of diameters of the clutch rotor, the clutch armature, and the clutch coil.

* * * * *